(12) United States Patent
Kuo

(10) Patent No.: US 7,488,105 B2
(45) Date of Patent: Feb. 10, 2009

(54) BACKLIGHT MODULE

(76) Inventor: Heng-Sheng Kuo, P.O. Box 26-757, Taipei 106 (TW)

( * ) Notice: Subject to any disclaimer, the term of this patent is extended or adjusted under 35 U.S.C. 154(b) by 202 days.

(21) Appl. No.: 11/449,847

(22) Filed: Jun. 9, 2006

(65) Prior Publication Data
US 2006/0227571 A1    Oct. 12, 2006

Related U.S. Application Data

(63) Continuation-in-part of application No. 10/857,383, filed on May 28, 2004, now abandoned.

(51) Int. Cl.
*F21V 7/04* (2006.01)
(52) U.S. Cl. .................... 362/633; 362/606; 349/58
(58) Field of Classification Search ............... 362/603, 362/606, 607, 614, 617, 618, 619, 620, 627, 362/632–634; 349/58–60
See application file for complete search history.

(56) References Cited

U.S. PATENT DOCUMENTS

| | | | | |
|---|---|---|---|---|
| 5,666,172 A | * | 9/1997 | Ida et al. | 349/58 |
| 5,966,191 A | * | 10/1999 | Lee | 349/58 |
| 5,999,238 A | * | 12/1999 | Ihara | 349/58 |
| 6,292,239 B1 | * | 9/2001 | Nagamura et al. | 349/58 |
| 6,388,722 B1 | * | 5/2002 | Yoshii et al. | 349/62 |
| 6,490,015 B1 | * | 12/2002 | Kim | 349/58 |
| 6,490,016 B1 | * | 12/2002 | Koura | 349/58 |
| 6,515,721 B2 | * | 2/2003 | Jin et al. | 349/58 |
| 6,611,302 B1 | * | 8/2003 | Ueda et al. | 349/58 |
| 6,762,807 B2 | * | 7/2004 | Lee et al. | 349/58 |
| 7,113,235 B2 | * | 9/2006 | Tsukamoto | 349/58 |
| 7,154,570 B2 | * | 12/2006 | Lee | 349/58 |
| 2005/0099604 A1 | * | 5/2005 | Mizumaki et al. | 353/27 R |

* cited by examiner

*Primary Examiner*—Sandra L. O'Shea
*Assistant Examiner*—Gunyoung T. Lee
(74) *Attorney, Agent, or Firm*—Rosenberg, Klein & Lee

(57) ABSTRACT

A backlight module has an upper frame and a lower frame engaged mutually for forming a receiving cavity therein, of which the upper frame has a stop base and is arranged at its top with a support sheet protruding inwardly along an inner perimeter thereof. A light-guide plate and a lighting member are arranged between the upper and lower frames, and a group of optical members is right on the support sheet in order to make the light from the lighting member via the light-guide platestop base uniform and to avoid the light being dissipated directly therefrom. Furthermore, the module is coupled with a substrate positioned on the stop base and over the optical members. The product thereby is easily and smoothly assembled. The group of optical members are conveniently checked, and the upper and lower frames are easily disassembled from each other if examination is necessary.

8 Claims, 11 Drawing Sheets

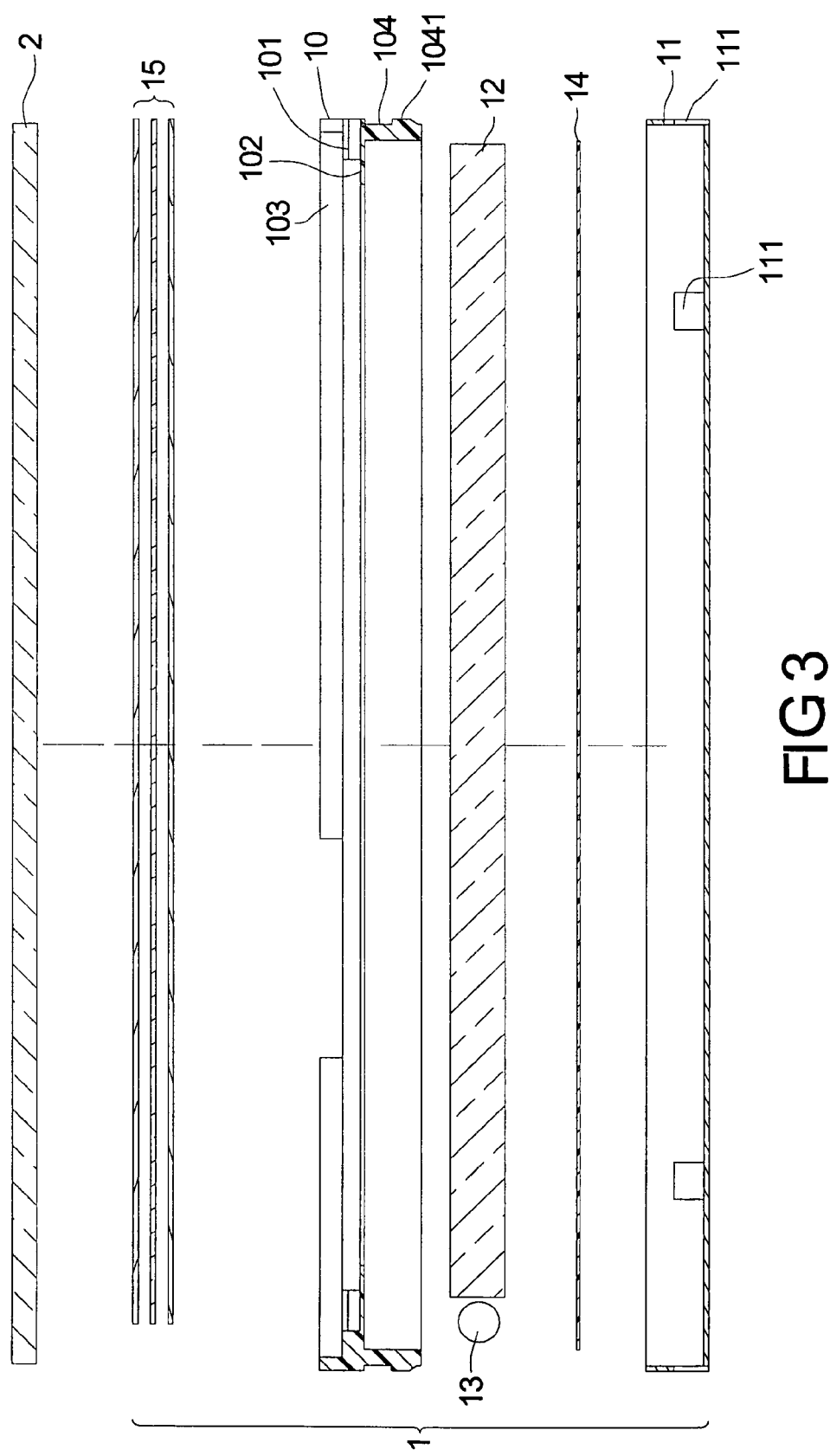

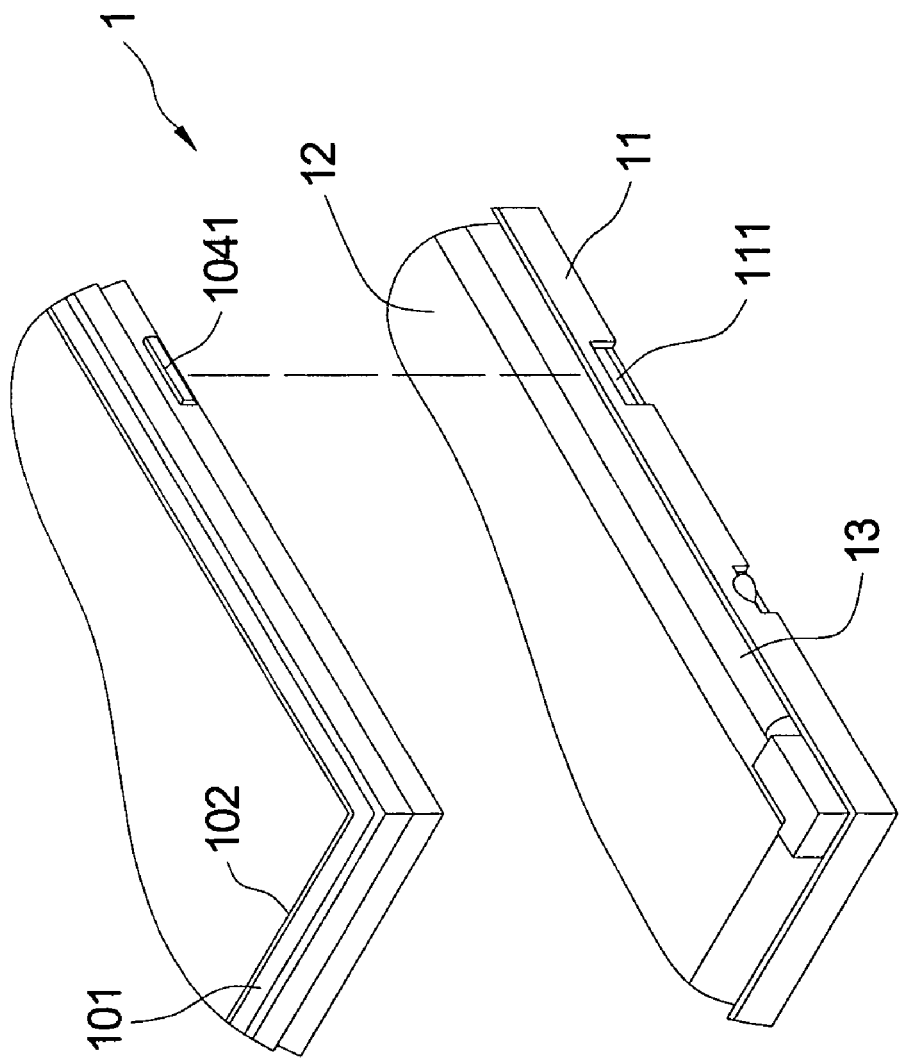

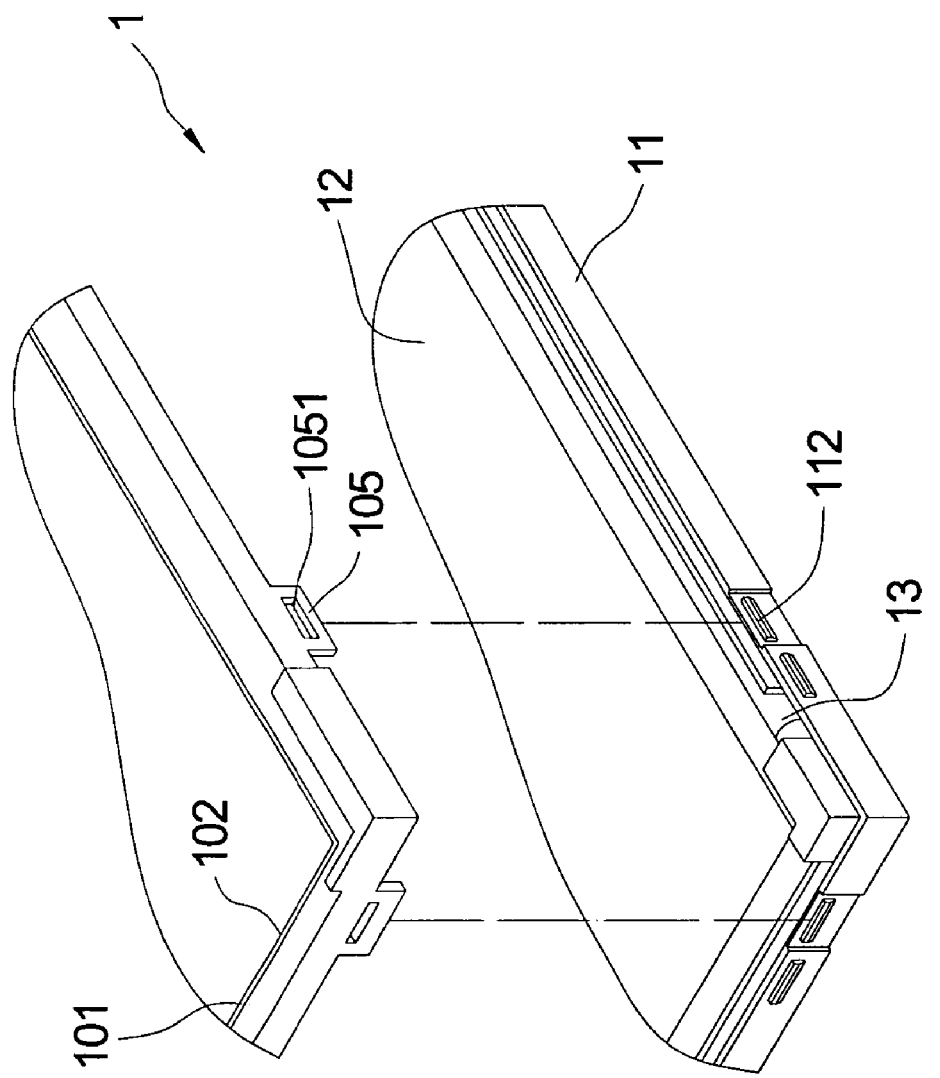

BACKLIGHT MODULE

This Application is a Continuation-in-Part of application Ser. No. 10/857,383, filed 28 May 2004 now abandoned, and entitled backlight module.

BACKGROUND OF THE INVENTION

1. Field of the Invention

This invention relates to a backlight module, and particularly to a backlight module that is easy for sequential procedures, including assembly, quality examination and disassembly.

2. Description of the Prior Art

Generally, a backlight module refers to a device member capable of providing a light source from the back of a product, which has been widely used in various products related to information, communication and consumer goods, such as liquid crystal displays (LCD), film scanners, slide projectors and so on. The backlight module mainly includes an incident light source, a light-guide plate, a diffusion sheet, a prism sheet and a brightness enhancement film (BEF). Put simply, its principle is that a self-luminous light from a light source, for example, a cold cathode fluorescent lamp (CCFL) and a lighting diode (LED), is conducted in by a light-guide plate to produce an even surface light source. Meanwhile, to keep the products competitive in future markets, the backlight module needs to take several product evolution directions into account: lighter weight, miniaturization, lower power consumption, higher brightness and lower cost.

Reference is made to FIG. 1, which is an assembly diagram of a conventional backlight module 1a. The module 1a includes an upper frame 10a and a lower frame 11a, which are engaged with each other and form a receiving cavity therebetween, and further a light-guide plate 12a, lighting member 13a, a reflective sheet 14a, at least one diffusion sheet 15a and at least one prism sheet 16a, all of which are received within the receiving cavity. The semi-finished module will be further coupled with a glass substrate 2a. The upper frame 10a is provided with a perimetric stop base 101a that is arranged to protrude inward along the inner perimeter at the top side of the frame 10a. During assembly of the module, the upper frame 10a is upside down with respect to FIG. 1, while the perimetric stop base 101a is located beneath the upper frame 10a. According to the design requirement, the diffusion sheet 15a and the prism sheet 16a are placed in order on the perimetric stop base 101a. After the light-guide plate 12a and the lighting member 13a are mounted, the reflective sheet 14a is laid on the light-guide plate 12a. The lower frame 11a and the upper frame 10a are then engaged for the purpose of securing the light-guide plate 12a and the lighting member 13a. At this time, the semi-finished product is roughly assembled. The semi-finished product is then put upside down, such that the perimetric stop base 101a is located above the light-guide plate 12a. The glass substrate 2a is mounted on the perimetric stop base 101a, allowing the glass substrate 2a in connection with the diffusion sheet 15a, the prism sheet 16a, the light-guide plate 12a, the lighting member 13a and the reflective sheet 14a to be arranged opposite the perimetric stop base 101a.

However, during assembly of the conventional backlight module 1a, a step of turning over the upper frame 10a is required, and it is thus obvious that the assembly process is not smooth. Furthermore, the lower frame 11a and the upper frame 10a are arranged with a mutual securing engagement structure. After the lower frame 11a is engaged and secured with the upper frame 10a, it is difficult to disassemble, which is disadvantageous to the improvement of production efficiency. If there is any need for maintenance and repair or if replacement of the diffusion sheet 15a or the prism sheet 16a becomes necessary, the rework process is bothersome to operators and the products are prone to damage. Therefore, some hazards of low product yield may occur while the structure is disadvantageous and could result in disfigurement or damage. The above-mentioned product damage includes scores and scratches on the diffusion sheet 15a, the prism sheet 16a, the light-guide plate 12a and the reflective sheet 14a, which adversely affect the overall brilliancy, thus reducing the value of the products. Moreover, depending on different design requirements, the quantity of the diffusion sheets 15a and the prism sheets 16a may not be the same, and neither the assembling sequence of the diffusion sheets 15a and the prism sheets 16a to be assembled is. In the event that a polarizing sheet, an intensifier sheet and other members are added for purpose of adaptation of further optical characteristic, and it is desired to perform a test process to verify the members are assembled in the right sequence and registered properly, similar problems occur during said test process. Disassembly of the engaged lower frame 11a and upper frame 10a is difficult, and the products are potentially damaged during disassembly and reassembly of the members. Additionally, in the assembled structure of the conventional backlight module 1a, the stop base 101a is arranged over the optical films; thus the upward and even light output obtained from the effect of those optical films is subject to reduced light output area due to blocking by the stop base 101a. The conventional backlight module 1a is unable to be made more economically.

Accordingly, this invention is provided to remove the above disadvantages with a reasonable design.

SUMMARY OF THE INVENTION

The main object of the invention is to provide a backlight module, which can reduce turnover steps, allowing the products to be easily and smoothly assembled and improves production efficiency to further reduce production costs.

Another object of the invention is to provide a backlight module, which allows convenient checking that the module is properly assembled. The module is additionally easily repaired, further improving assembly efficiency and reducing labor wastes.

Yet another object of the invention is to provide a backlight module, which can avoid product damage during disassembly of the engaged upper and lower frames and eliminate defect possibility to reduce further production costs.

Yet another object of the invention is to provide a backlight module, which can increase light availability and a light output area, to achieve efficient utilization of the backlight module.

In order to achieve the above object, the present invention provides a backlight module, comprising mutually engaged upper and lower frames, of which the upper frame has a stop base and is arranged at its top with a support sheet protruding inwardly along an inner perimeter thereof. A light-guide plate and a lighting member are arranged between the upper and lower frames. A group of optical members are arranged on the support sheet, and a substrate is arranged on the stop base. The group of optical members is arranged in order to make uniform the light from the lighting member via the light-guide plate and to avoid the light being dissipated directly therefrom, and thereby allow the product to be easily and smoothly assembled. The group of optical members can be conveniently checked. The upper and lower frames are easily disassembled from each other if the examination is necessary.

The features and technical contents of the present invention will become apparent from the detailed description of the present invention with reference to the accompanying drawings; the detailed description and drawings are intended to be illustrative and not restrictive.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 3 is a cross dicomposition view illustrating another embodiment of the backlight module according to the present invention;

FIG. 3A is an enlarged side view according to FIG. 3;

FIG. 4A is an enlarged side view according to FIG. 4;

DETAILED DESCRIPTION OF THE EMBODIMENTS

Figure 1:
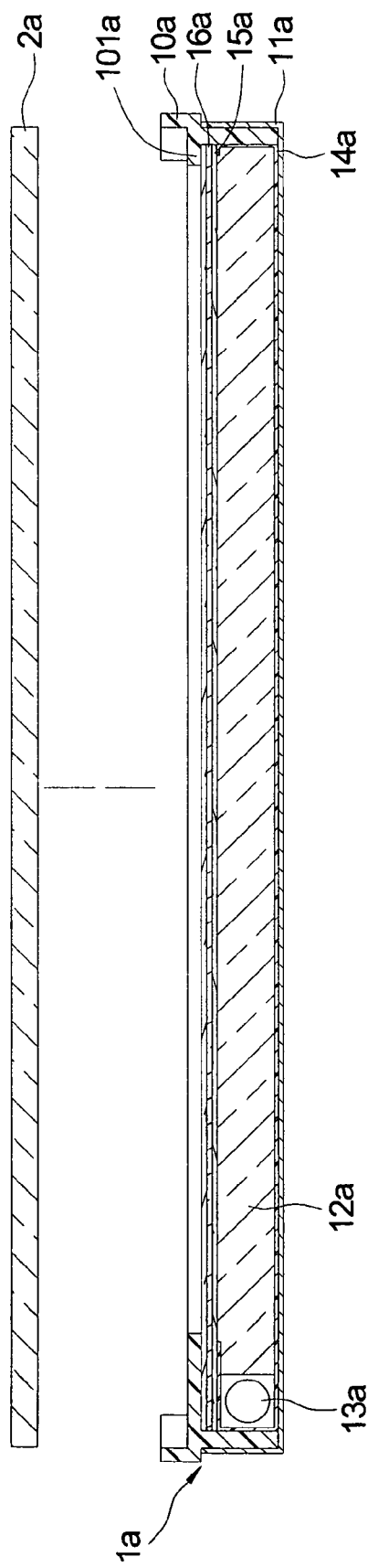
FIG. 1 is a diagrammatic illustrating a conventional backlight module.
Figure 2:
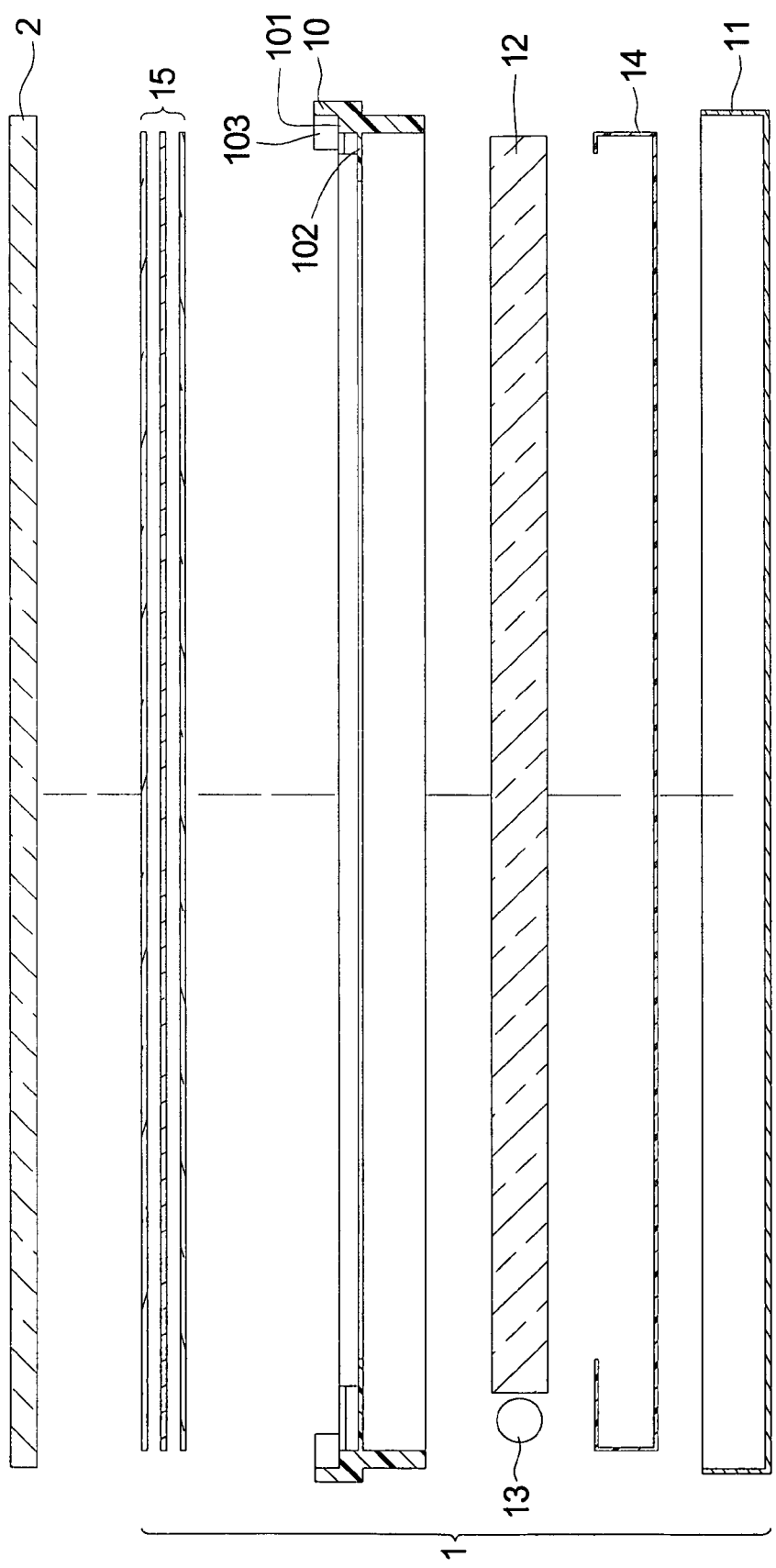
FIG. 2 is a cross dicomposition view illustrating an embodiment of a backlight module according to the present invention.

FIG. 2 illustrates a backlight module 1 according to this invention, comprising a mutually engaged an upper frame 10 and a lower frame 11 for forming a receiving cavity therein. The engagement structure between the upper frame 10 and the lower frame 11 shouldn't be not limited to the embodiments mentioned below. The upper frame 10 includes a stop base 101, a support sheet 102 extending horizontally along an inner perimeter of the stop base 101, and a limit wall 103 extending upwardly from a top surface of the stop base 101. The support sheet 102 encompasses an inner perimeter of the stop base 101 in order to avoid the light being dissipated directly from a non-overlapping space between the stop base 101 and the optical members 15, 50 that the light utility and availability will increase. The backlight module 1 further includes a light-guide plate 12 positioned inside the receiving cavity between the lower frame 11 and the upper frame 10, a lighting member 13 positioned inside the receiving cavity and adjacent to at least one lateral side of the light-guide plate 12, a group of optical members 15 arranged right on the support sheet 102 in order to make uniform the light emitted from the lighting member 13 via the light-guide plate 12; and a substrate 2 disposed on the stop base 101 and over the optical members 15 and adjacent to the limit wall 103. In one embodiment, the upper frame 10 and the lower frame 11 can be made of plastic and metal (particularly iron), respectively.

The support sheet 102 of the upper frame 10 together with the lower frame 11 forms the receiving cavity, so as to be used to sandwich securely the light-guide plate 12 and the lighting member 13. The upper frame 10 can be provided such that the size and height of the support sheet 102 can be adjusted, for further facilitating disposal of the light-guide plate 12. In this embodiment, a reflection member 14 is arranged between the light-guide plate 12 and the lower frame 10 and further extends to cover two lateral sides of the light-guide plate 12. Otherwise, the reflection member 14 is arranged between the light-guide plate 12 and the lower frame 11, which may be disposed in the form of a reflection sheet or a reflection film beneath the light-guide plate 12; alternatively, the reflection member 14 with reflection capability can be formed by directly plating a reflection layer on the lower surface of the light-guide plate 12.

Figure 2A:
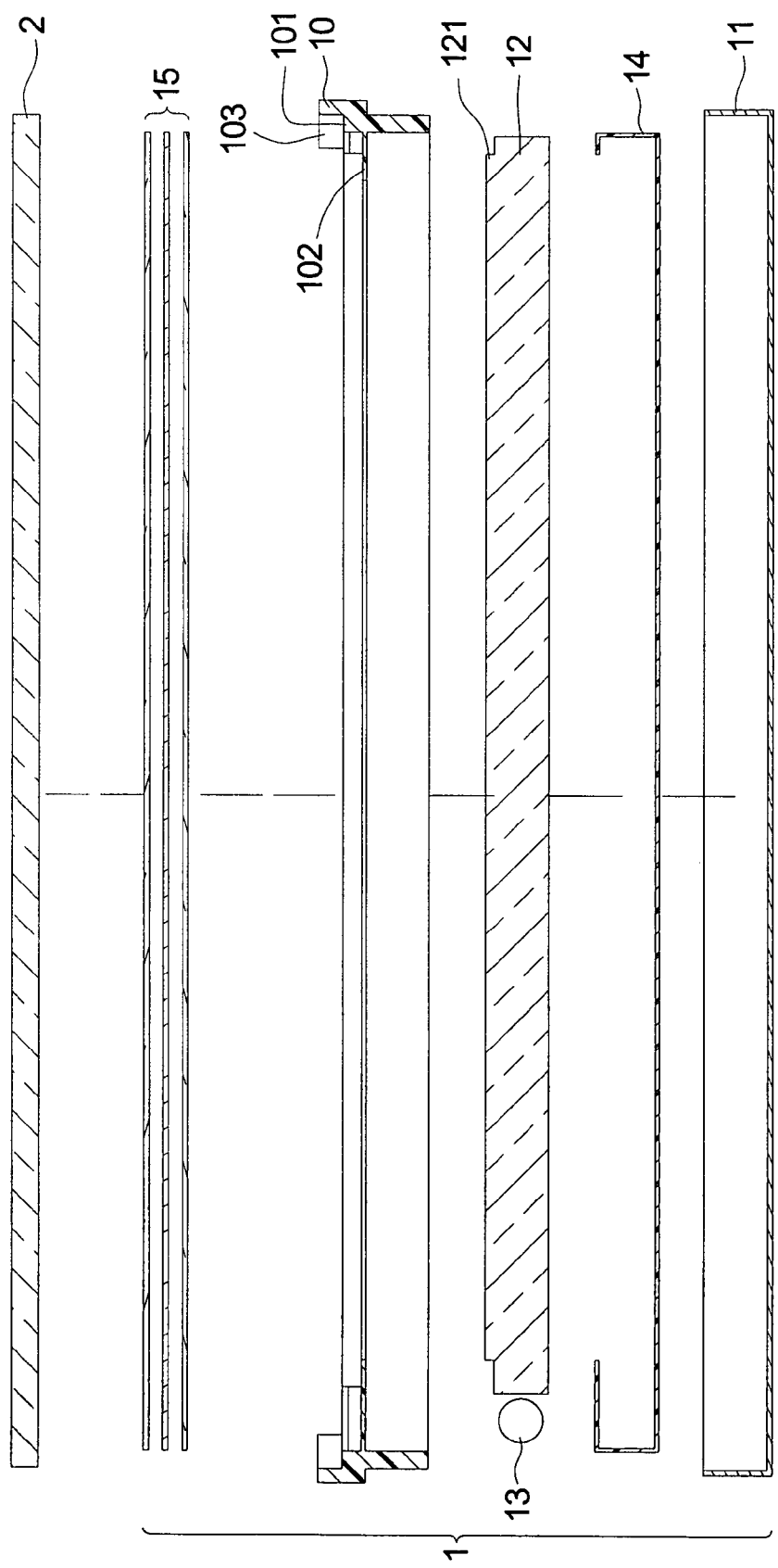
FIG. 2A is cross dicomposition view to show a raise thin layer of the light-guide plate according to the present invention.

In particular, due to the existence of the support sheet 102, a small gap is formed between the light-guide plate 12 and the group of optical members 15. A thin layer 121, illustrated in FIG. 2A, is raised from a top of the light guide plate 12 as an extension of the light-guide plate 12, so as to fill in the gap and be joined with the group of optical members 15.

Reference is made to FIG. 3, the upper frame 10 has a straight wall 104 extending downwardly therefrom and being received in the lower frame 11. In this embodiment, the limit wall 103 encompasses the upper frame 10 in a continuous manner. In this embodiment, the stop base 101 encompasses the inner perimeter of the upper frame 10, and the support sheet 102 encompasses an inner perimeter of the stop base 101. Illustrated in FIG. 3A, the straight wall 104 has a projection 1041 corresponding to a slot 111 of the lower frame 11 so that the upper frame 10 engages with the lower frame 11.

Figure 4:
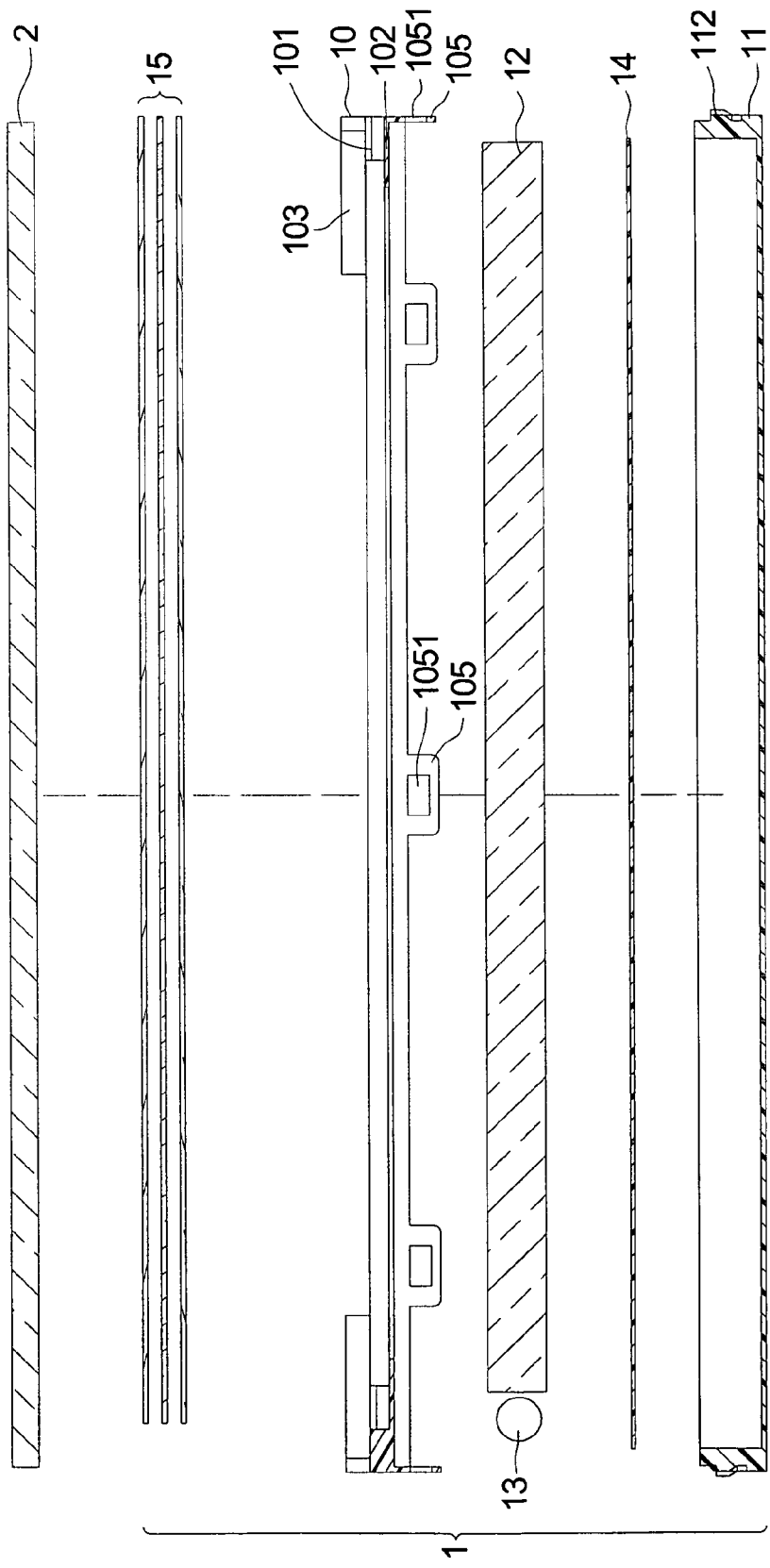
FIG. 4 is a cross dicomposition view illustrating an additional embodiment of the backlight module according to the present invention.

Reference is made to FIGS. 4 and 4A, the lower frame 11 has a projection 112 corresponding to a flap 105, which extends from the upper frame 10 with a slot 1051, so that the upper frame 10 engages with the lower frame 11. In this embodiment, the limit wall 103 is arranged discontinuously on at least two corners of the upper frame 10.

Figure 5:
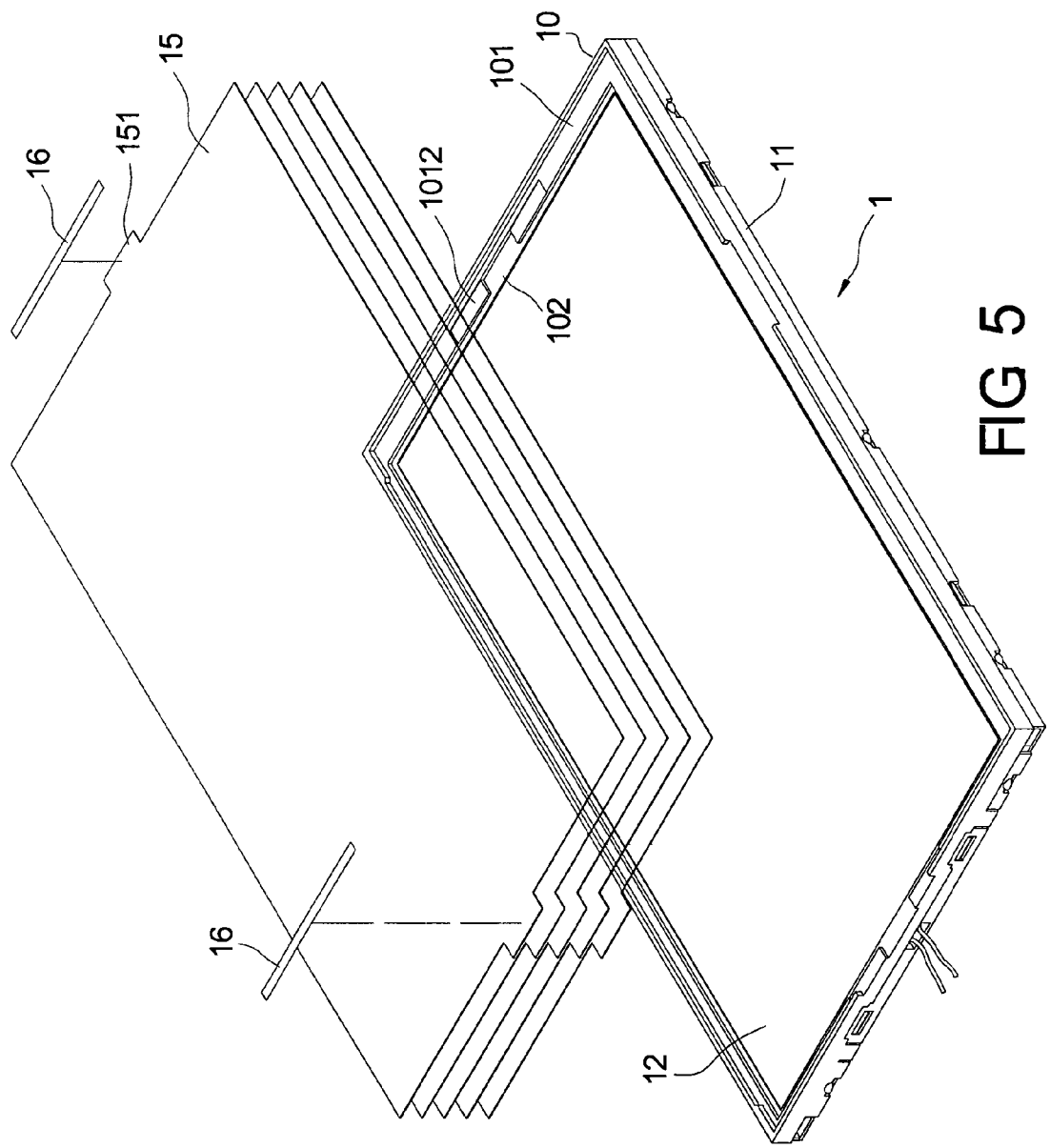
FIG. 5 is a perspective view of the an embodiment of the optical members according to the present invention.
Figure 5A:
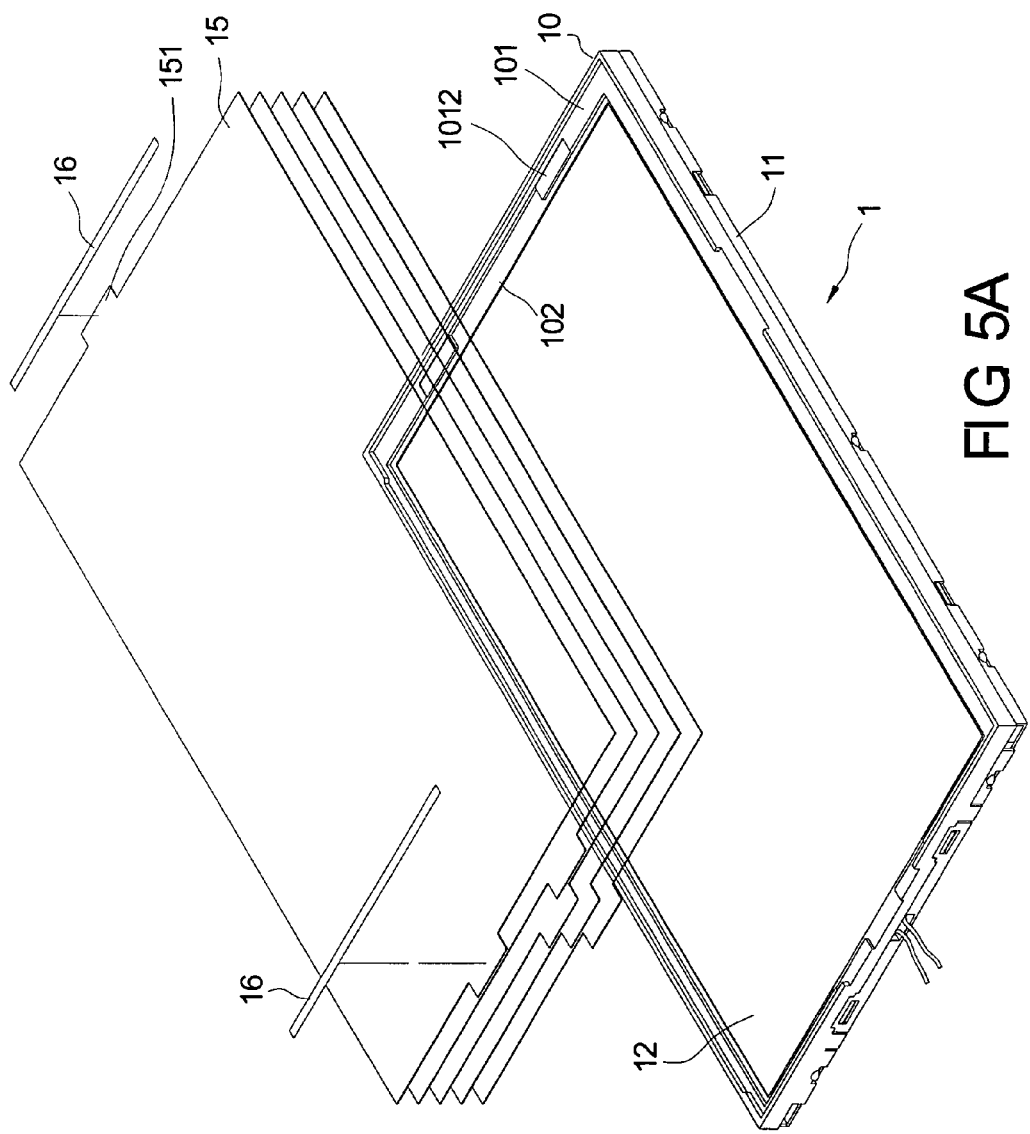
FIG. 5A is a perspective view of the another embodiment of the optical members according to the present invention.
Figure 5B:
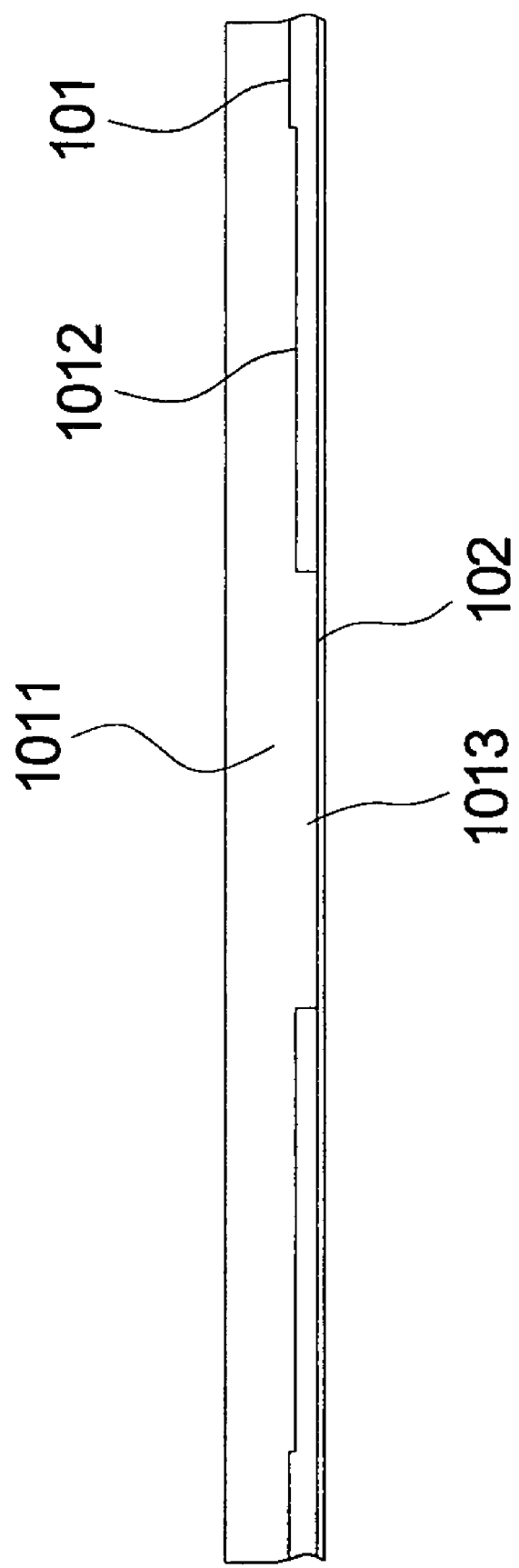
FIG. 5B is an enlarged cross-sectional profile according to FIG. 5.
Figure 6:
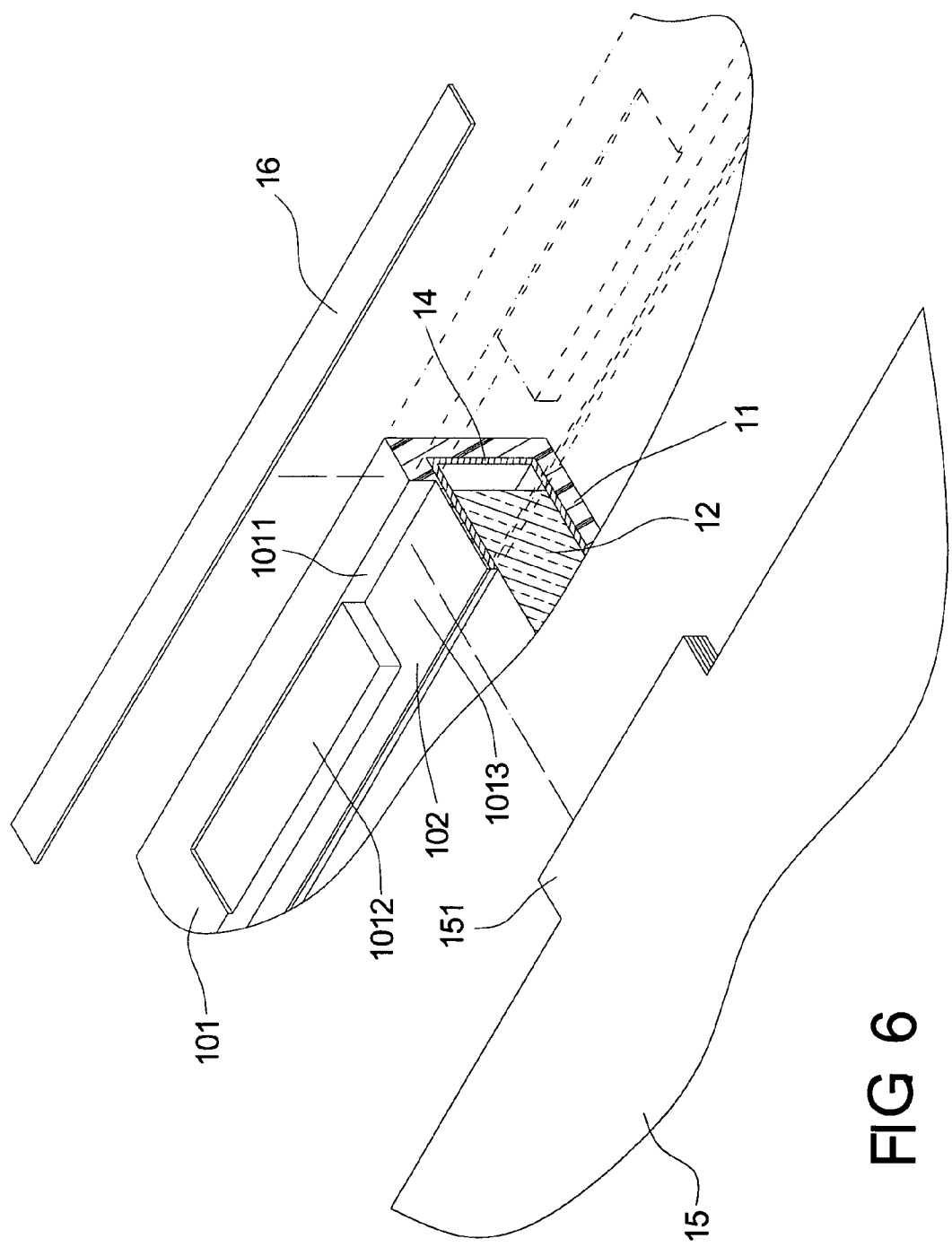
FIG. 6 is an enlarged perspective view according to FIG. 5.

Illustrated in FIGS. 4, 5A, 5B and 6, the stop base 101 has a recess 1011 formed on at least one side thereof to define two step portions 1012 and an indentation 1013 between the two step portions 1012 in order to reveal the support sheet 102. Each of the optical members 15 has a tab 151, and these tabs 151 may be aligned as illustrated in FIG. 5A or not aligned with one another for being received inside the recess 1011. In FIG. 5, the tabs 151 correspond to the indentation 1013 to contact with the revealed surface of the support sheet 102. Furthermore, an adhesive member 16 can be applied onto the outermost one of the tabs 151 and the two step portions 1012 at the same time, in order to secure the optical members 15 to the upper frame 10 thereby. In FIG. 5A, the tabs 151 correspond to and contact to the revealed surface of the indentation 1013 and top surfaces of the step portions 1012, so that these irregular tabs 151 of the optical members 15 are accommodated in the recess 1011 with the indentation. The adhesive tape 16 still can be applied for connecting the optical members 15 to the upper frame 10. In particular, the support sheet 102 shown in FIG. 7 can encompass at least one side along an inner perimeter of the stop base 101, that would achieve similar effects.

The lighting member 13 may be a cold cathode fluorescent lamp (CCFL) or a light-emitting diode (LED), which may be strip-shaped or L-shaped, and be arranged aside or around the light-guide plate 12, in order to meet the requirement of nondirectional light output. The group of optical members 15 comprises a diffusion sheet, a prism sheet and so on. Depending on various design requirements, the number and sequence of these diffusion sheets and prism sheets may be configured variably. In order to achieve special optical effects, the group of optical members 15 may further comprise a polarizing sheet, a color filter (CF), brightness enhancement film (BEF), anti-glare film (AG film), anti-reflective film (AR film) and so on, according to specific design requirements.

The backlight module according to the embodiment illustrated in FIG. 2 is assembled in the following steps. The reflection member 14, the light-guide 12 and the lighting member 13 are directly received into the receiving cavity in the lower frame 11. The upper frame 10 is then inserted to be jacketed and engaged with the lower frame 11, so as to sandwich the light-guide plate 12 and lighting member 13 together. The need for a turnover step for the upper frame 10 is eliminated, thereby facilitating the easy and smooth assembly of the module, and thus further speeding production flow and improving production efficiency. Additionally, according to a specific design requirement, the group of optical members 15 are arranged above the stop base 101, such that the group of optical members 15 and the light-guide plate 12 form a relationship in which they are positioned at opposite sides of the stop base 101. In particular, a side light source emitted from the lighting member 13 is converted into a surface light source through the light-guide plate 12. After the light source passes through the stop base 101, benefiting from the optical effect of the diffusion sheet or the prism sheet in the group of optical members 15, the projection of the surface light source is not affected by the limit of the stop base 101, thereby increasing the area of the light output and achieving the efficient utilization of the backlight module 1.

During situations such as, for example, examination, maintenance or material replacement during the production process, the backlight module 1 according to this invention can easily be examined and the constitution and configuration of the group of optical members 15 changed and replaced, without dissassembling the upper frame 10 from the lower frame 11, thereby improving assembly, the quality of the backlight module 1, and the entire production efficiency. In addition, without dissassembling the mutually engaged lower frame 11 and upper frame 10, the risk of unnecessary damage to the products, such as scratches resulting in uneven overall brilliance can be avoided, thereby reducing the manufacturing cost.

With respect to the backlight module industry, material costs are a significant portion of the total cost of a backlight module, and some key materials are mainly sourced from only a few Japanese and US manufacturers; the profit margins of backlight module manufacturers therefore rests on assembling charge and other expenses. From the view point of the manufacturing process, a backlight module can be considered to be a labor-intensive assembly industry with high management requirements. Therefore, the backlight module 1 according to the invention features advantages of being easy to assemble and examine and being convenient to maintain. This not only improves the smoothness of the production flow, but also effectively reduces examination and scrap costs; furthermore the efficient utilization of the light output area is improved. The backlight module 1 according to this invention has a great advantage in keeping competitive in the era of profit squeezing. In conclusion, the desired objects and functions are achieved in this invention; while the techniques and means have been disclosed above merely as one of the preferred embodiments of this invention. It is intended that the appended claims cover all such modifications and variations made to these embodiments as fall within the spirit and scope of this present invention.

What is claimed is:

1. A backlight module, comprising:
   a lower frame and an upper frame engaging with each other for forming a receiving cavity therein; wherein the lower frame as at least one slot formed therein;
   the upper frame includes a stop base, a support sheet extending horizontally from a bottom along an inner perimeter of the stop base, and a limit wall extending upwardly from a top surface of the stop base; the upper frame further includes at least one projection disposed in correspondence to the at least one slot of the lower frame for engagement therewith;
   a light-guide plate positioned inside the receiving cavity between the lower frame and the upper frame;
   a lighting member positioned inside the receiving cavity and being adjacent to at least one lateral side of the light-guide plate;
   a group of optical members arranged directly on an upper face of the support sheet of said upper frame in order to make light emitted from the lighting member via the light-guide plate uniform; and
   a substrate disposed on the stop base and over the optical members, and being adjacent to the limit wall.

2. The backlight module according to claim 1, wherein the stop base has a recess formed on at least one side thereof to define two step portions and an indentation between the two step portions in order to reveal the support sheet, and each of the optical members has a tab; the tabs correspond to the recess, and contacts with the revealed surface of the support sheet and a top surface of each step portion respectively.

3. The backlight module according to claim 2, further including an adhesive member adhering at least the outermost one of the tabs to the upper frames, so that all of the optical member can be secured to the upper frame.

4. The backlight module according to claim 1, wherein the support sheet encompasses along the inner perimeter of the stop base in a continuous manner.

5. The backlight module according to claim 1, further including a reflection member sandwiched between the light-guide plate and the lower frame.

6. The backlight module according to claim 1, wherein the light-guide plate has a thin layer raised from a top thereof to join with the group of optical members.

7. The backlight module according to claim 1, wherein the limit wall encompasses the upper frame in a continuous manner.

8. The backlight module according to claim 1, wherein the limit wall is arranged discontinuously on at least two corners of the upper frame.

* * * * *